United States Patent
Ikuta

(10) Patent No.: US 7,878,438 B1
(45) Date of Patent: Feb. 1, 2011

(54) DUAL-BEARING REEL SOUND PRODUCING DEVICE

(75) Inventor: Takeshi Ikuta, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/793,405

(22) Filed: Jun. 3, 2010

(30) Foreign Application Priority Data

Jul. 14, 2009 (JP) ............................. 2009-165886

(51) Int. Cl.
*A01K 89/01* (2006.01)

(52) U.S. Cl. .................. 242/306; 242/307; 242/308

(58) Field of Classification Search .............. 242/306, 242/307, 308, 305
See application file for complete search history.

(56) References Cited

U.S. PATENT DOCUMENTS

| 2,336,737 A * | 12/1943 | Kreis | 242/308 |
|---|---|---|---|
| 2,633,308 A * | 3/1953 | Zientowski | 242/308 |
| 3,138,343 A * | 6/1964 | Henze | 242/308 |
| 4,088,279 A * | 5/1978 | Karlsson et al. | 242/307 |
| 6,189,822 B1 * | 2/2001 | Ikuta | 242/296 |
| 6,688,545 B2 * | 2/2004 | Kitajima et al. | 242/306 |
| 7,090,160 B2 * | 8/2006 | Morimoto et al. | 242/307 |
| 7,175,121 B2 * | 2/2007 | Ikuta | 242/307 |
| 7,226,013 B1 * | 6/2007 | Kang | 242/306 |
| 2005/0006512 A1 | 1/2005 | Morimoto et al. | |

FOREIGN PATENT DOCUMENTS

JP 2005-013075 A 1/2005

* cited by examiner

*Primary Examiner*—Emmanuel M Marcelo
(74) *Attorney, Agent, or Firm*—Global IP Counselors, LLP

(57) ABSTRACT

The spool sound producing mechanism includes a collar member, an operation member, a convexo-concave member, a sound producing member and urging members. The collar member has first and second overlapping apertures. The operation member has a shaft portion that is movably attached and positioned in either the aperture. The convexo-concave member is configured to rotate with a spool. The sound producing member is attached to the shaft portion and allows a tip of the sound producing member to be disposed between or separated from convexes of the convexo-concave member. The urging members are configured to urge the sound producing member to direct the tip of the sound producing member towards the plurality of convexes of the convexo-concave member.

9 Claims, 15 Drawing Sheets

DUAL-BEARING REEL SOUND PRODUCING DEVICE

CROSS-REFERENCE TO RELATED APPLICATIONS

This application claims priority to Japanese Patent Application No. 2009-165886 filed on Jul. 14, 2009, the entirety of which is hereby incorporated by reference.

BACKGROUND

1. Field of the Invention

The present invention relates to a sound producing device, more specifically, to a dual-bearing reel sound producing device configured to produce sound in conjunction with rotation of a fishing-line winding spool attached to a reel body of a dual-bearing reel in a rotatable state.

2. Background Information

Dual-bearing reel sound producing devices that are configured to produce sound in conjunction with rotation of a spool and simultaneously to apply resistance to rotation of the spool are well-known. Japan Laid-open Patent Application Publication No. JP-A-2005-013075 describes a dual-bearing reel sound producing device of this type. A sound producing device includes a convexo-concave member, an operation member, a sound producing member, and an urging member. The convexo-concave member is attached to a spool shaft in a non-rotatable state. The operation member is attached to a reel body while being movable in both a direction for making contact with the convexo-concave member and a direction for separating away from the convexo-concave member. The sound producing member is configured to vibrate in conjunction with rotation of the convexo-concave member. The urging member is configured to urge the sound producing member. The convexo-concave member includes plural convexes on its outer periphery. The convexes are circumferentially aligned at predetermined intervals. The operation member is attached into an elongated aperture formed in the lateral part of the reel body while being movable in a radial direction of the spool shaft. The elongated aperture herein passes through the lateral part of the reel body and has a roughly oval outline. The sound producing member is attached to the operation member in a pivotable state. The tip of the sound producing member is movable between a sound activation position and a sound deactivation position in response to movement of the operation member. The tip of the sound producing member is interposed between two given adjacent convexes in the sound activation position, whereas the tip of the sound producing member is separated from the interposed position between the adjacent convexes in the sound deactivation position. The urging member is configured to urge the sound producing member for directing the tip of the sound producing member towards substantially the rotation center of the convexo-concave member when the sound producing member is located in the sound activation position. When the operation member is moved towards one of the longer-axial ends of the elongated aperture, the tip of the sound producing device is accordingly moved to the sound activation position where it is interposed between two given adjacent convexes. A sound activation state is thus produced. When the operation member is moved towards the other of the longer-axial ends of the elongated aperture, on the other hand, the tip of the sound producing member is moved to the sound deactivation position where it is separated from the interposed position between the adjacent convexes. A sound deactivation state is thus produced. In short, the sound activation state and the sound deactivation state are switchable in response to movement of the operation member within the elongated aperture.

As described above, the well-known sound producing devices are configured to switch between the sound activation state and the sound deactivation state in response to movement of the operation member within the elongated aperture. According to the sound producing devices, however, the operation member is simply moved within the elongated aperture. Therefore, when an angler actually moves the operation member from one of the longer-axial ends of the elongated aperture to the other thereof, the angler cannot feel a sense of clicking that would assure the angler that the operation member has been reliably moved. To deal with this drawback, it is plausible to provide separately the base end of the sound producing member with a click mechanism that is configured to make contact with the inner part of the reel body in conjunction with movement of the operation member. In this case, however, the reel body is required to have a container space for the click mechanism, and the click mechanism is possibly required to have a complex structure.

In view of the above, it will be apparent to those skilled in the art from this disclosure that there exists a need for an improved dual-bearing reel sound producing device with a simple structure for making an angler feel a sense of clicking when an operation member is moved. This invention addresses this need in the art as well as other needs, which will become apparent to those skilled in the art from this disclosure.

SUMMARY

A dual-bearing reel sound producing device according to a first aspect is configured to produce sound in conjunction with rotation of a fishing-line winding spool attached to a reel body of a dual-bearing reel in a rotatable state. The dual-bearing reel sound producing device includes a collar member, an operation member, a convexo-concave member, a sound producing member, and urging members. The collar member is made of elastic material. The collar member is attached into an elongated aperture. The elongate aperture passes through a lateral part of the reel body and has a roughly oval outline. The collar member includes a first aperture and a second aperture. Each of the first and second apertures has a roughly circular outline. The first and second apertures communicate with each other while being partially overlapped with each other in a center part of the collar member. Both ends of the first and second apertures as a communicated aperture have outlines that roughly match with the outlines of the both longer axial ends of the elongated aperture. Thus, the outer shape of the first and second apertures or the collar member nearly correspond to an inner shape of the elongated aperture. The operation member includes a shaft portion and an operation portion. The shaft portion is movably attached to and positioned in either the first aperture or the second aperture of the collar member. The operation portion is disposed on a front end of the shaft portion while being exposed to the outside from the lateral part of the reel body. The disc-shaped convexo-concave member is configured to rotate in conjunction with rotation of the spool. The convexo-concave member includes a plurality of convexes on an outer periphery thereof. The convexes are circumferentially arranged at predetermined intervals. The sound producing member is attached to an end of the shaft portion of the operation member opposite the front end in a pivotable state. The sound producing member is configured to move to either a sound activation position or a sound deactivation position in conjunction with movement of the operation member to either the first aperture or the second aperture. The sound activation position allows a tip of the sound producing member to be disposed between any two adjacent convexes of the plurality of convexes of the convexo-concave member. The sound deactivation position allows the tip of the sound producing member to be separated away from said any two adjacent convexes of the plurality of convexes of the convexo-concave member. The urging members are configured to urge the sound producing member to direct the tip of the sound producing member towards the rotation center of the convexo-concave member.

According to the dual-bearing reel sound producing device of the first aspect, the collar member is attached to the elongated aperture that has a roughly oval outline and passes through the lateral part of the reel body. The collar member is made of elastic material and includes the first and second apertures. Further, the shaft portion of the operation member is moved and set in either of the first and second apertures of the collar member. Further, the sound activation state is produced when the tip of the sound producing member is moved to the sound activation position where it is interposed between two given adjacent convexes of the convexo-concave member in conjunction with movement of the shaft portion of the operation member towards the first aperture of the collar member. On the other hand, the sound deactivation state is produced when the tip of the sound producing member is separated from the interposed position between the adjacent convexes of the convexo-concave member in conjunction with movement of the shaft portion of the operation member towards the second aperture of the collar member. The collar member is thus made of elastic material and includes the first and second apertures. Therefore, the center part of the collar member is deformed and expanded when the shaft portion of the operation member is moved between the first and second apertures. Accordingly, the shaft portion of the operation member is moved and set to either of the first and second apertures of the collar member. Consequently, structure of the sound producing device can be simplified with the collar member, which is made of elastic material and includes the first and second apertures with relatively simple shapes. Further, when the shaft portion of the operation member is moved to either of the first and second apertures of the collar member, it is possible to make an angler feel a sense of clicking to an extent the angler assures that the operation member is reliably moved.

A dual-bearing reel sound producing device according to a second aspect relates to the dual-bearing reel sound producing device according to the first aspect, wherein the collar member is an elastic member made of synthetic resin. According to the dual-bearing reel sound producing device, the collar member can be easily made of elastic synthetic resin such as polyacetal at a low cost.

A dual-bearing reel sound producing device according to a third aspect relates to the dual-bearing reel sound producing device according to one of the first and second aspects, wherein the collar member has a roughly calabash-shaped outline. According to the dual-bearing reel sound producing device, the center part of the collar member is narrowed because of its roughly calabash-shaped (i.e., 8-shaped) outline. Therefore, positioning of the shaft portion of the operation member will be easy with respect to the first aperture and the second aperture.

A dual-bearing reel sound producing device according to a fourth aspect relates to the dual-bearing reel sound producing device according to one of the first to third aspects, wherein each of the first and second apertures of the collar member has an inner diameter roughly the same as an outer diameter of the shaft portion. According to the dual-bearing reel sound producing device, positioning of the first aperture and the second aperture can be reliably achieved with respect to the shaft portion of the operation member because the inner diameters of the first and second apertures are roughly the same as the outer diameter of the shaft portion of the operation member.

A dual-bearing reel sound producing device according to a fifth aspect relates to the dual-bearing reel sound producing device according to one of the first to fourth aspects, wherein the collar member has a longer-axial length roughly the same as that of the elongated aperture. According to the dual-bearing reel sound producing device, the collar member can be easily attached and fixed into the elongated aperture because the longer-axial length of the collar member and that of the elongated aperture are roughly the same.

A dual-bearing reel sound producing device according to a sixth aspect relates to the dual-bearing reel sound producing device according to one of the first to fifth aspects, wherein the shaft portion is made of metal. According to the dual-bearing reel sound producing device, the shaft portion is made of metal such as copper alloy. Accordingly, when the shaft portion is moved to either of the first and second apertures of the collar member, it is possible to make an angler feel a good sense of clicking to an extent the angler assures that the collar member is reliably moved.

A dual-bearing reel sound producing device according to a seventh aspect relates to the dual-bearing reel sound producing device according to one of the first to sixth aspects, wherein the sound producing member has a roughly T-shaped outline and includes attachment portions and a sound producing portion. Here, the attachment portions are formed on both ends of the sound producing member for attaching the urging members. The sound producing portion is extended from a center part interposed between the attachment portions in a direction perpendicular to the attachment portions. According to the dual-bearing reel sound producing device, the urging members are disposed on the attachment portions formed on the both ends of the sound producing member. Therefore, the tip of the sound producing portion can be gently directed towards the rotation center of the convexo-concave member.

According to the dual-bearing reel sound producing device, the collar member is attached into the elongated hole with a roughly oval outline while passing through the lateral part of the reel body. The collar member is made of elastic material and includes the first and second apertures. Further, the shaft portion of the operation member is configured to be moved and set to be in either of the first and second apertures of the collar member. Therefore, the dual-bearing reel sound producing device can produce a clicking sound with a simple structure in order to make an angler feel that the operation member is reliably moved.

These and other objects, features, aspects, and advantages of the present invention will become apparent to those skilled in the art from the following detailed description, which, taken in conjunction with the annexed drawings, discloses exemplary embodiments.

BRIEF DESCRIPTION OF THE DRAWINGS

Referring now to the attached drawings which form a part of this original disclosure.

DETAILED DESCRIPTION OF THE EXEMPLARY EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
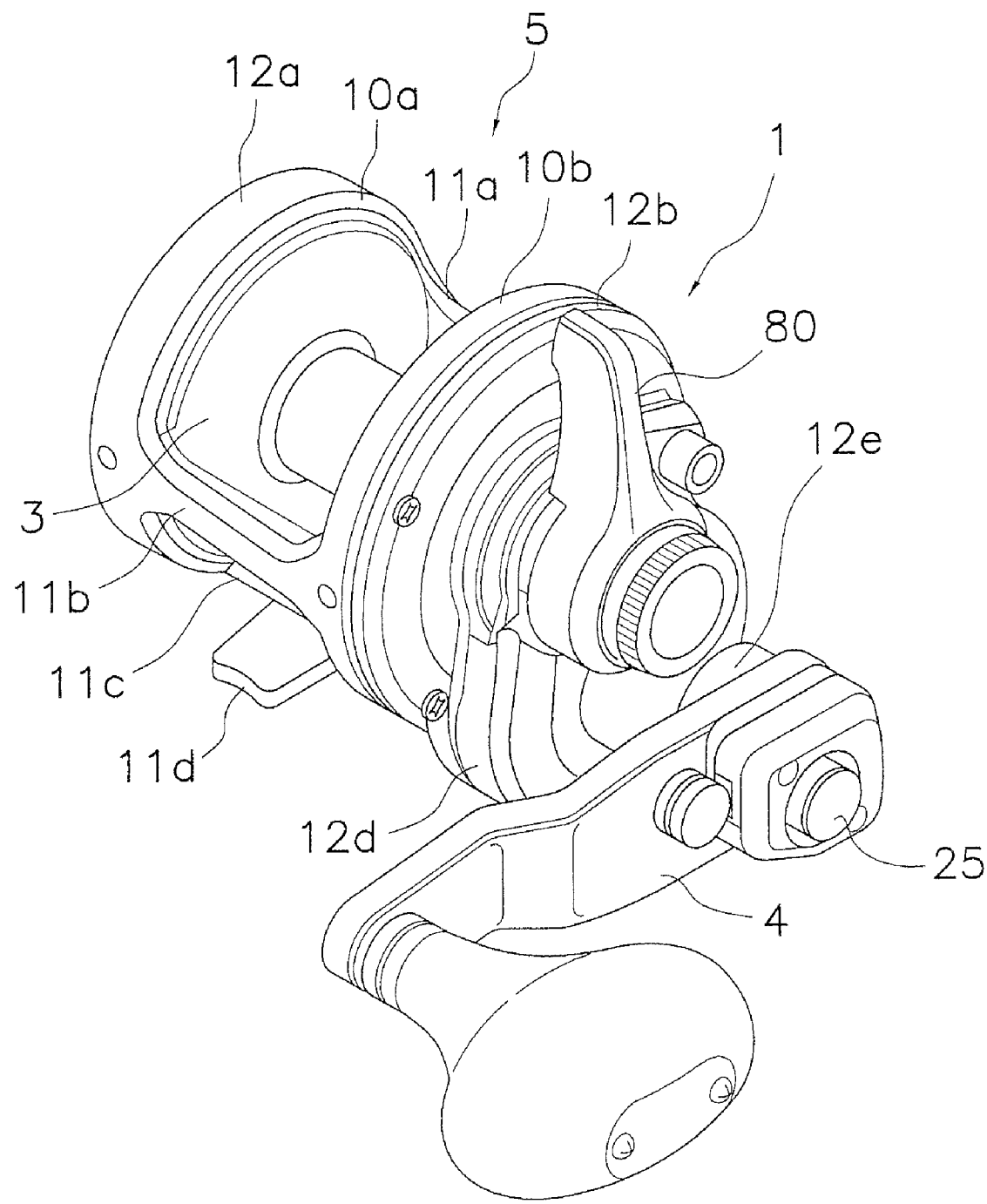
FIG. 1 is a perspective view of a dual-bearing reel according to an exemplary embodiment.
Figure 2:
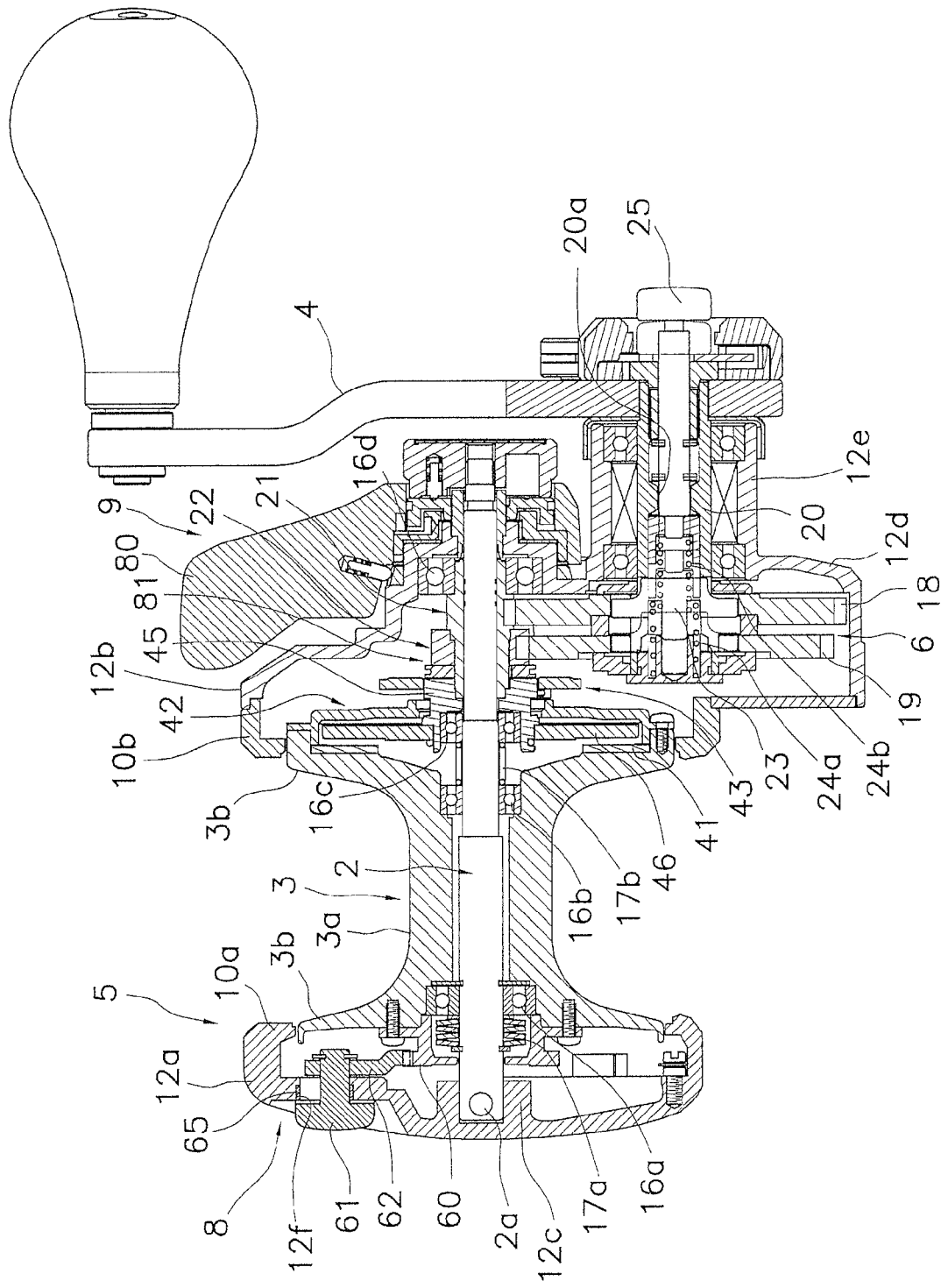
FIG. 2 is a cross-sectional view of the dual-bearing reel.

As illustrated in FIGS. 1 and 2, a dual-bearing reel according to an exemplary embodiment is a medium-sized lever drag reel. The lever drag reel includes a tubular reel body 1, a spool shaft 2, a spool 3, and a handle 4. As used herein, axial, axially, or any similar term refers to the direction parallel or substantially parallel to the axis of rotation of the spool 3 unless otherwise defined. The spool shaft 2 is attached to the center part of the reel body 1 while being prevented from rotating and allowed to move axially relative to the reel body 1. The spool 3 is supported by the spool shaft 2 while being allowed to rotate and prevented from axially moving. The handle 4 is disposed lateral to the reel body 1. As illustrated in FIG. 2, the lever drag reel further includes a rotation transmission mechanism 6 and a lever drag mechanism 9 in the interior of the reel body 1. The rotation transmission mechanism 6 is configured to deliver rotation of the handle 4 to the spool 3. The lever drag mechanism 9 is configured to brake rotation of the spool 3 in a fishing line release direction.

Figure 3:
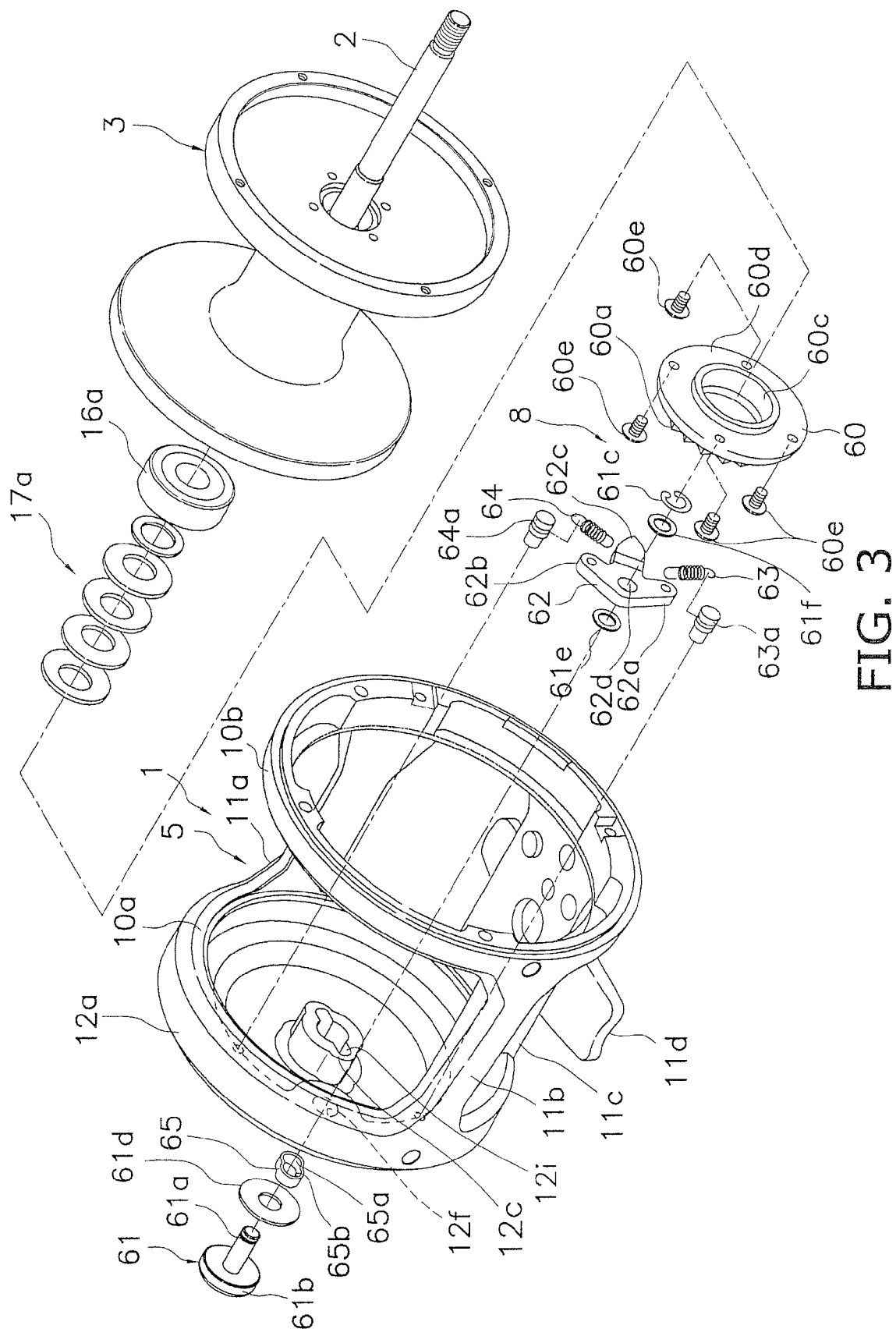
FIG. 3 is an exploded perspective view of a spool sound producing mechanism and its periphery in the dual-bearing reel.
Figure 6:
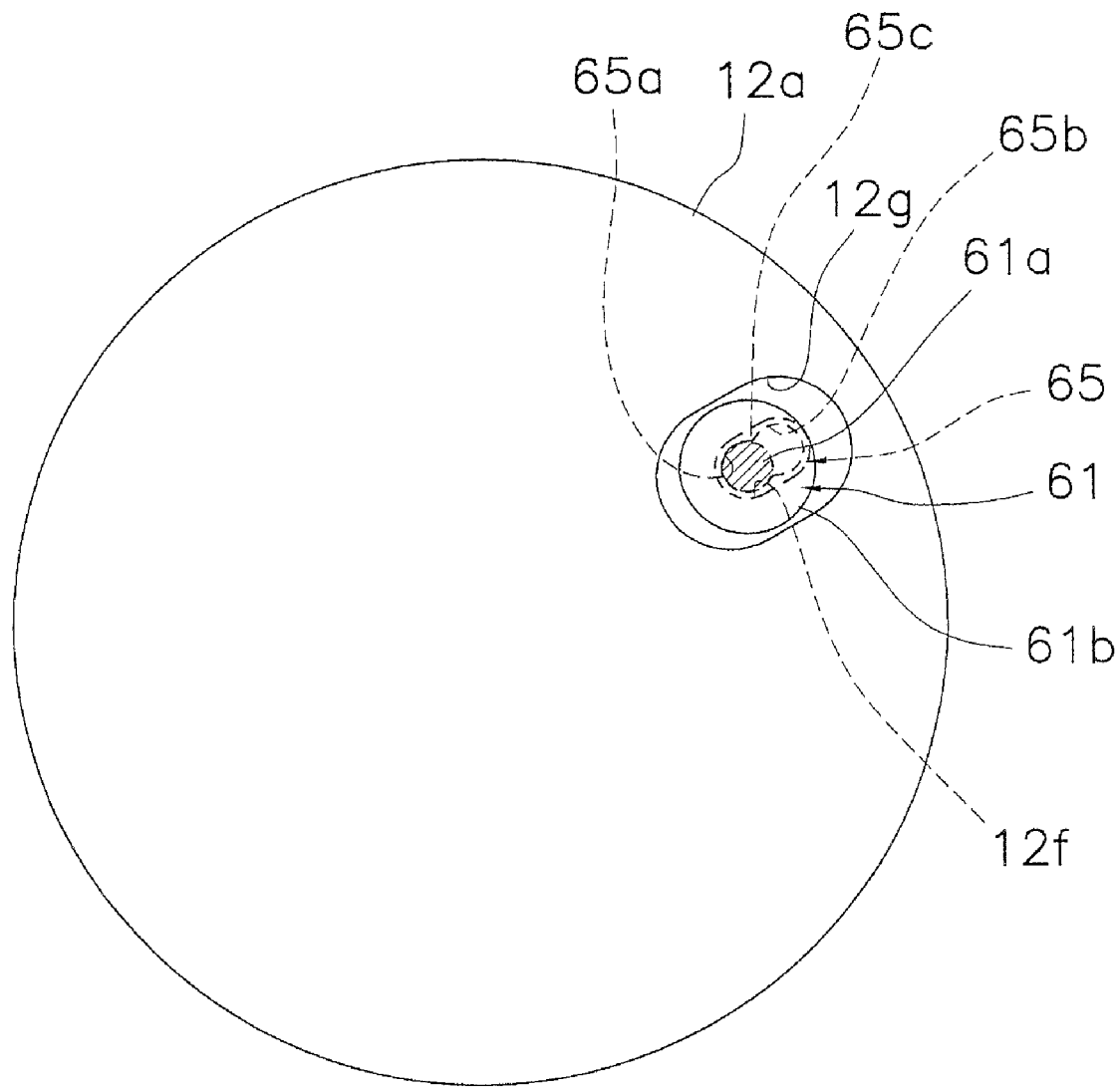
FIG. 6 is a simplified side view of a convexo-concave member, a collar member, and their peripheries in the dual-bearing reel when the spool sound producing mechanism is set to be in the sound activation state.
Figure 7:
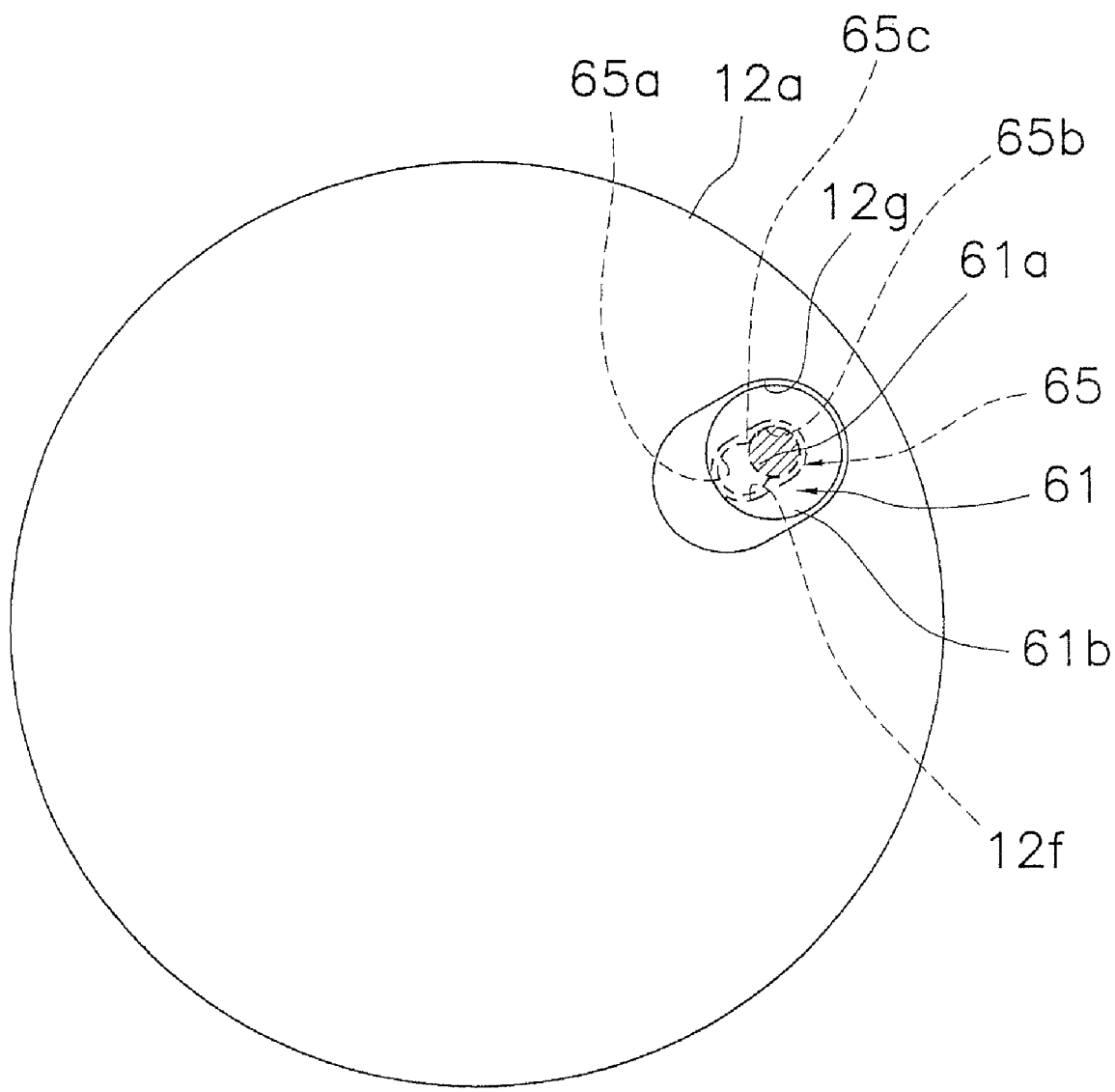
FIG. 7 is a simplified side view of the convexo-concave member, the collar, and their peripheries in the dual-bearing reel when the spool sound producing mechanism is set to be in the sound deactivation state.
Figure 10:
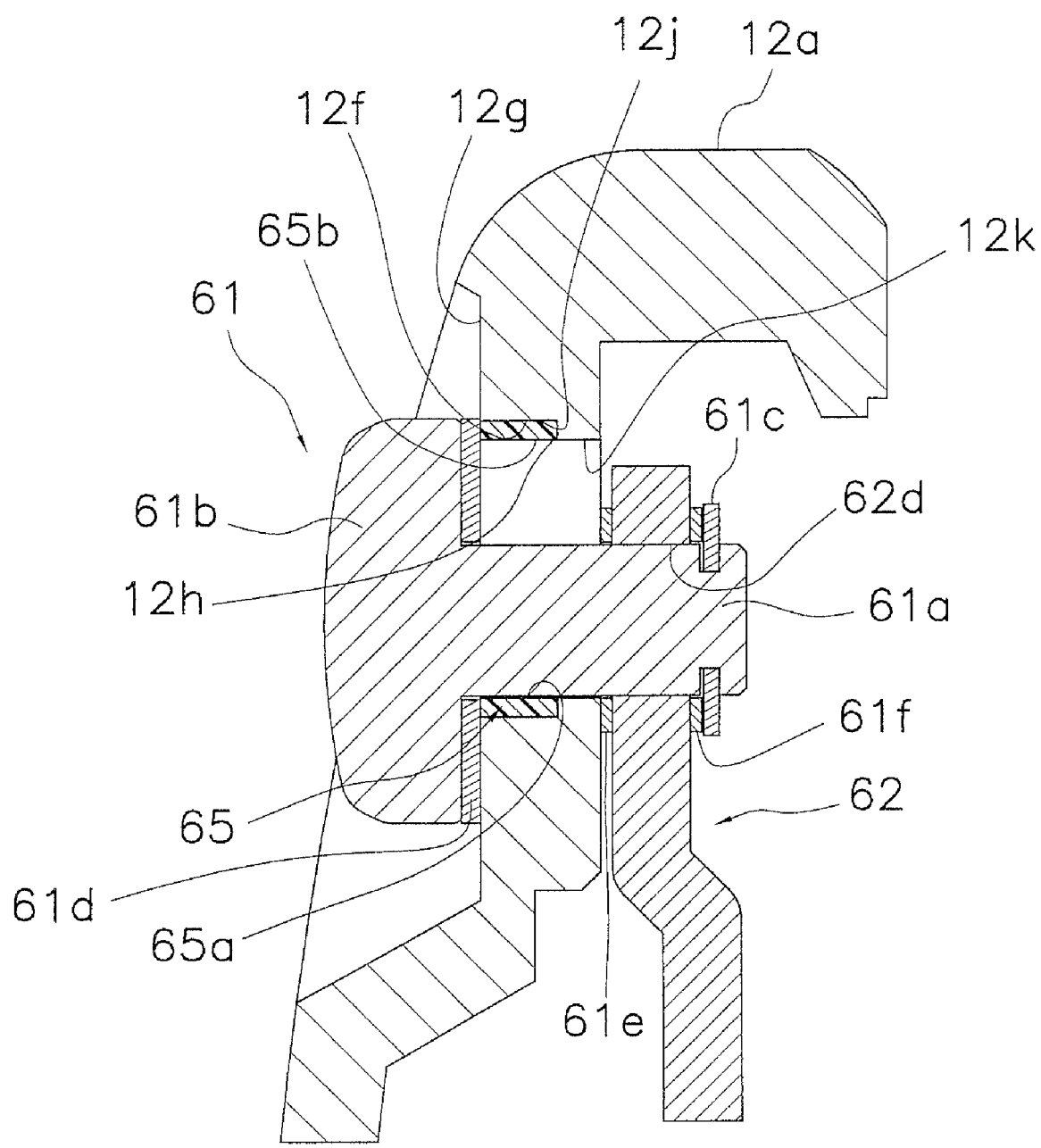
FIG. 10 is a cross-sectional side view of the operation member and the collar member when the spool sound producing mechanism is set to be in the sound activation state.
Figure 11:
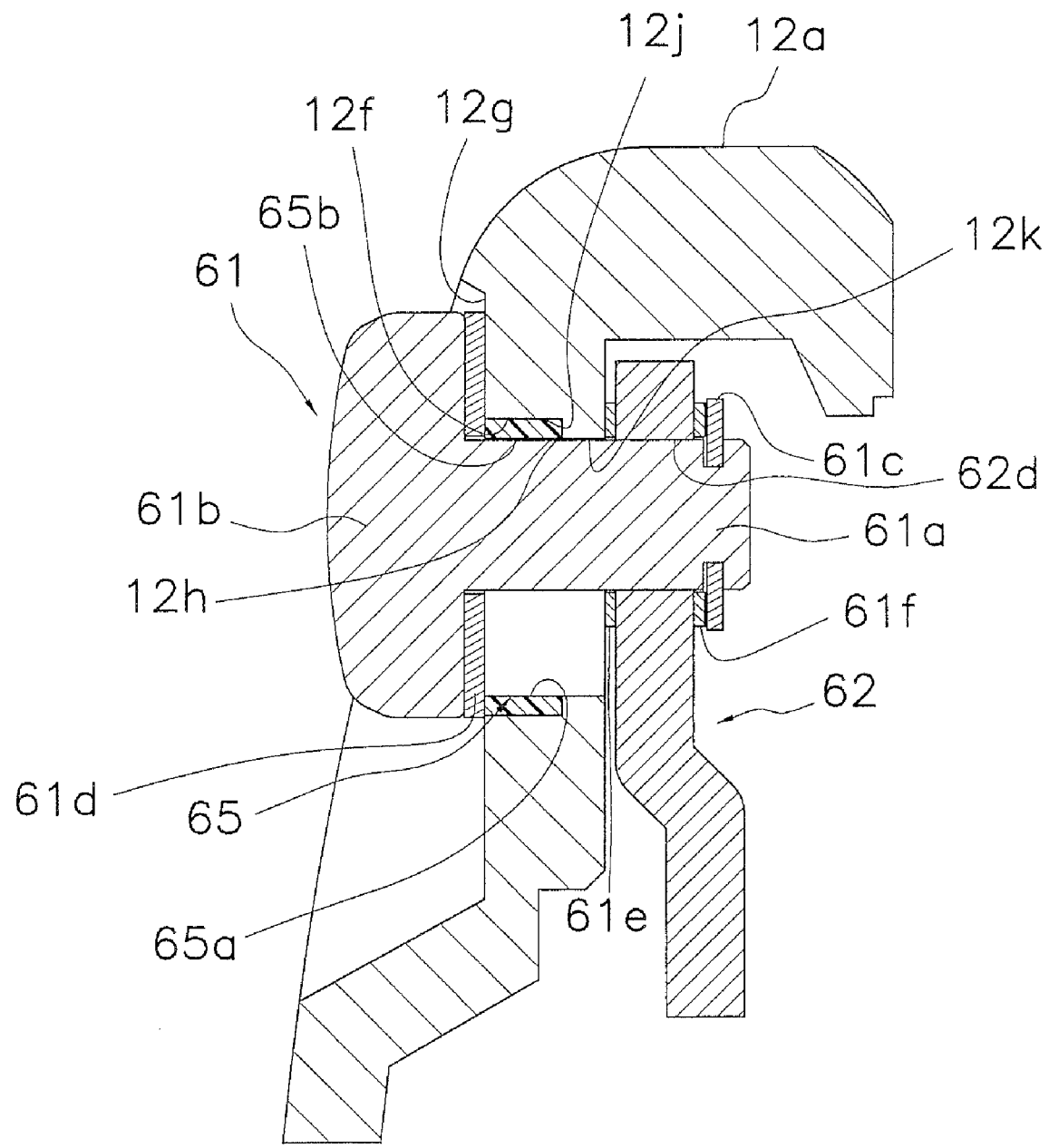
FIG. 11 is a cross-sectional side view of the operation member and the collar member when the spool sound producing mechanism is set to be in the sound deactivation state.
Figure 12:
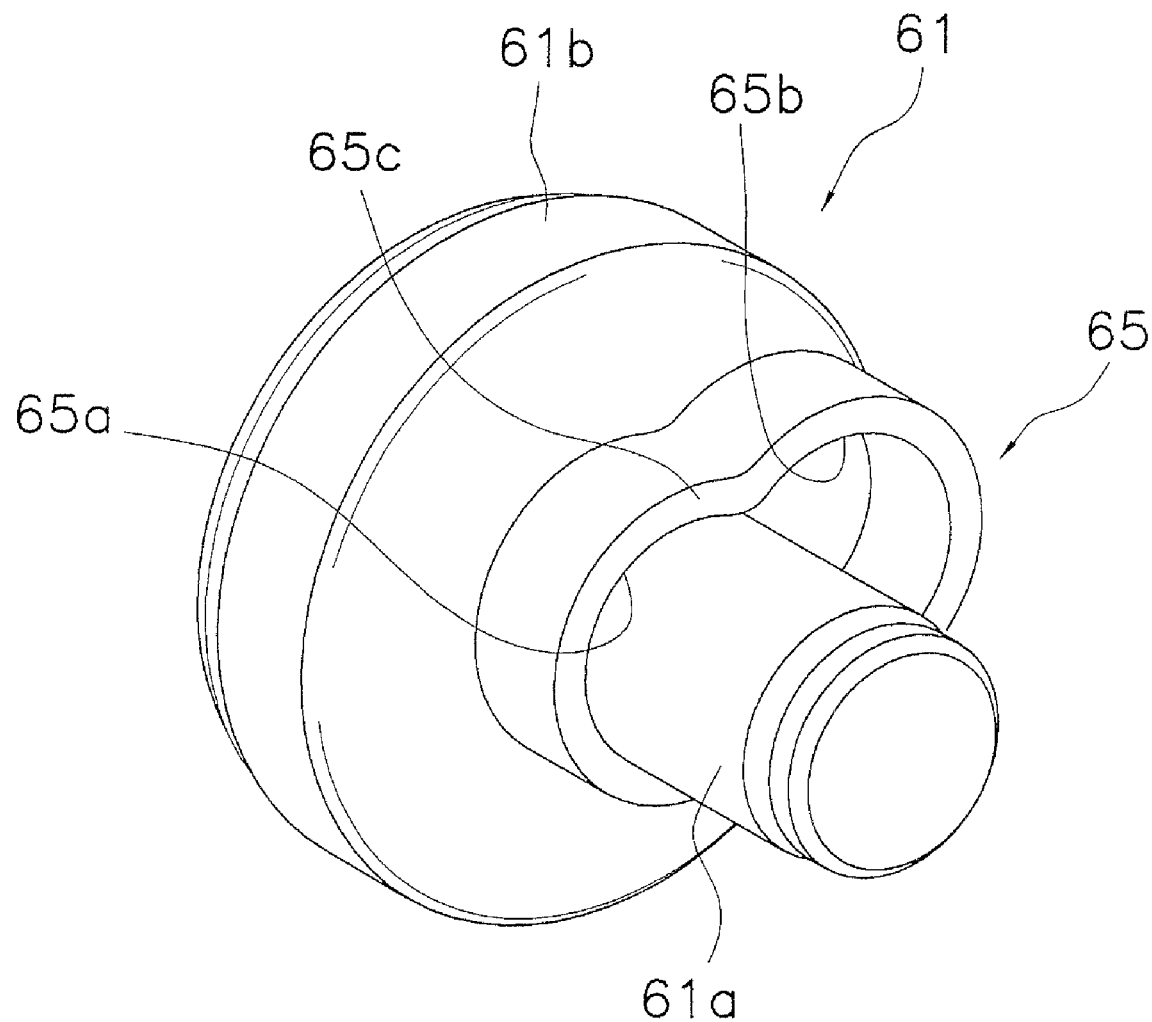
FIG. 12 is a perspective view of the operation member and the collar member when the spool sound producing mechanism is set to be in the sound activation state.
Figure 13:
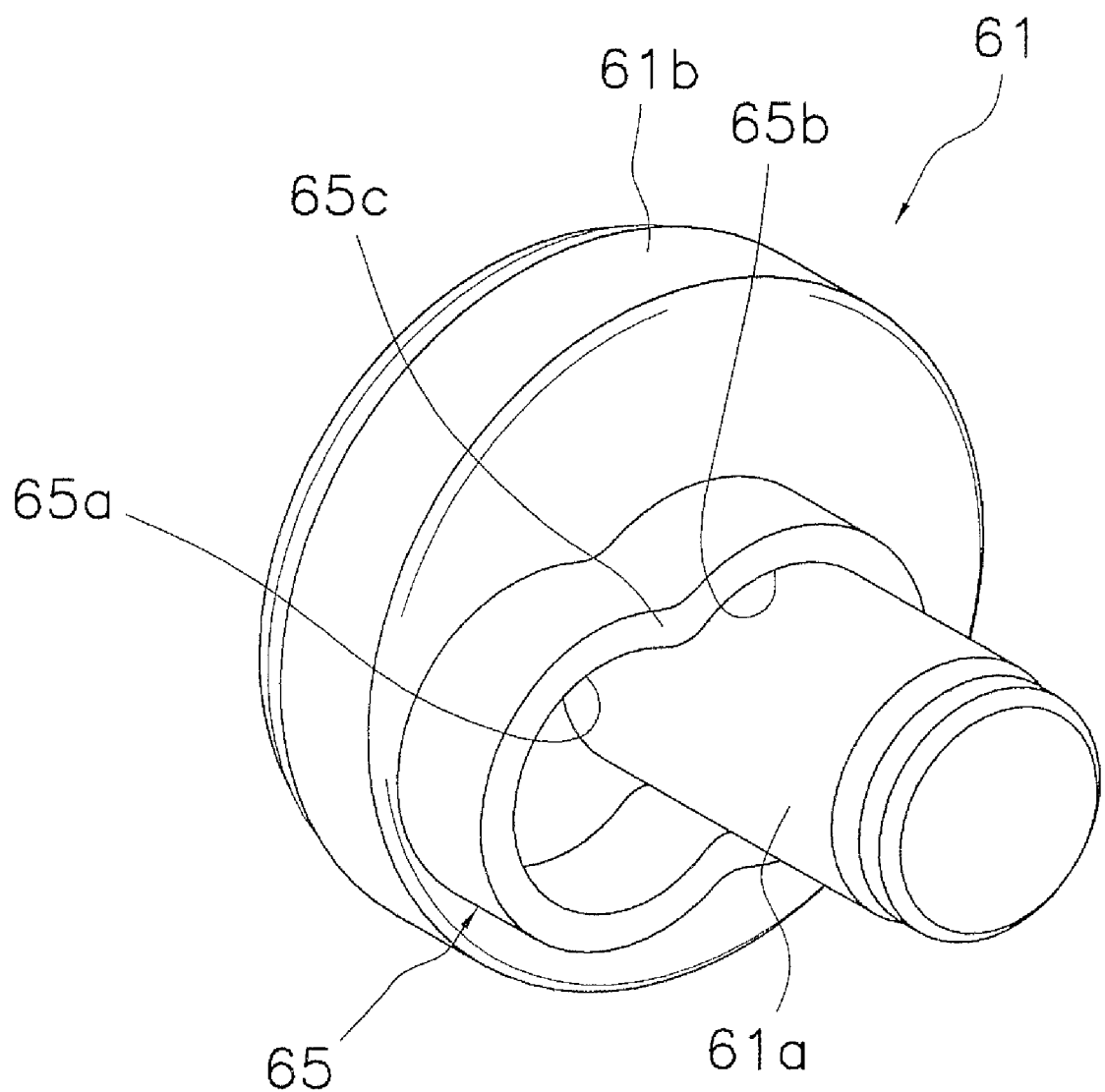
FIG. 13 is a perspective view of the operation member and the collar member when the spool sound producing mechanism is set to be in the sound deactivation state.

As illustrated in FIG. 1, the reel body 1 includes a metal frame 5 composed of a pair of a first side plate 10a and a second side plate 10b, coupling portions 11a, 11b, and 11c, and a first cover member 12a. The first and second side plates 10a and 10b are a pair of right and left saucer-shaped metal plates. The coupling portions 11a, 11b, and 11c couple the first side plate 10a and the second side plate 10b at the front, the rear, and the bottom of the frame 5. The first cover member 12a is integrally formed with the first side plate 10a to cover the outside of the first side plate 10a, and can be formed as a unitary one piece member. As illustrated in FIGS. 2 and 3, the first cover member 12a includes an elongated aperture 12f in an upper right portion of its lateral part, seen from the left side of FIGS. 2 and 3. The elongated aperture 12f passes through the lateral part of the first cover member 12a and has a roughly oval outline. As illustrated in FIGS. 6, 7, and 10, the longer or major axis of the elongated aperture 12f, which is perpendicular or substantially perpendicular to the axis of rotation of the spool 3, is overlapped with a line extended from the center of the spool 3 in an upper right direction of 45-degree angle. In other words, if the center of the positions where the coupling portions 11b, 11a, and 11c couple the first cover member 12a respectively define the 0 degree, 180 degree, and 270 degree points of the cover member 12a, the longer axis of the elongated aperture 12f extends toward the 45 degree point. The elongated aperture 12f is a stepped through hole for allowing a collar member 65 of a spool sound producing mechanism 8 described below to be attached therein. As illustrated in FIGS. 10 and 11, the elongated aperture 12f has first and second walls 12j and 12k that have the same or similar shape, in this embodiment an oval shape, except that the first wall 12j extend outwardly in a radial direction of the first cover member 12a father than the second walls 12k. The first and second walls 12j and 12k are joined by a stepped portion 12h that extends perpendicular or substantially perpendicular to the first and second walls 12j and 12k. As illustrated in FIGS. 10 and 11, the first cover member 12a further includes a housing recess 12g on its lateral part. Specifically, the housing recess 12g is formed on the outside of the outline of the elongated aperture 12f. The housing recess 12g has an outline similar to and larger than that of the elongated aperture 12f. The housing recess 12g is recessed in an axial direction relative to the spool 3 to contain an operation portion 61b of an operation member 61 of the spool sound producing mechanism 8 described below. As illustrated in FIGS. 6 and 7, the longer or major axis of the housing recess 12g, which is perpendicular or substantially perpendicular to the axis of rotation of the spool 3, overlaps with the line extended from the center of the spool 3 in the upper right direction of 45-degree angle. In other words, the longer axis of the housing recess 12g overlaps the longer axis of the elongated aperture 12f. The housing recess 12g has a roughly oval-shaped outline.

Referring to FIGS. 1, 2, and 3, the coupling portion 11c of the frame 5 includes a fishing-rod attachment portion 11d for attaching the lever drag reel to a fishing rod. The fishing-rod attachment portion 11d is integrally formed with the coupling portion 11c. The first and second side plates 10a and 10b, the coupling portions 11a, 11b, and 11c, and the first cover member 12a are integrally formed by metal cutting work, and can be a unitary one piece member.

As illustrated in FIG. 1, the reel body 1 includes a second cover member 12b made of metal. The second cover member 12b covers the outside of the second side plate 10b. Further, each of the first and second side plates 10a and 10b includes an opening to allow the spool 3 to pass through. Referring to FIGS. 1 and 2, the first cover member 12*a* includes a boss portion 12*c* in its interior. The boss portion 12*c* supports the left end of the spool shaft 2 while preventing the spool shaft 2 from rotating and allowing it to move axially relative to the reel body 1. As illustrated in FIGS. 2 and 3, the first cover member 12*a* contains the spool sound producing mechanism 8 in its interior. The spool sound producing mechanism 8 is configured to produce sound in conjunction with rotation of the spool 3.

As illustrated in FIGS. 2 and 3, the spool sound producing mechanism 8 is configured to produce sound in conjunction with rotation of the spool 3. Further, the spool sound producing mechanism 8 can be switched between a sound activation state to allow the spool sound producing mechanism 8 to produce sound when the spool 3 rotates and a sound deactivation state to prevent the spool sound producing mechanism 8 from producing sound. FIGS. 4, 6, 8, 10, and 12 illustrate disposition of members of the spool sound producing mechanism 8 set to be in the sound activation state. On the other hand, FIGS. 5, 7, 9, 11, and 13 illustrate disposition of members of the spool sound producing mechanism 8 set to be in the sound deactivation state.

As illustrated in FIGS. 2 and 3, the spool sound producing mechanism 8 includes a convexo-concave member 60, the operation member 61, a sound producing member 62, a first urging member 63, a second urging member 64, and the collar member 65. The convexo-concave member 60 is configured to rotate in conjunction with rotation of the spool 3. The operation member 61 is attached to the convexo-concave member 60 while being movable in both a direction away from the convexo-concave member 60 and a direction close to the convexo-concave member 60. The sound producing member 62 is attached to the operation member 61 in a pivotable state. The first urging member 63 and the second urging member 64 urge the sound producing member 62 towards the convexo-concave member 60. The collar member 65 is an elastic member attached to the elongated aperture 12*f* of the first cover member 12*a* for positioning the operation member 61 in either the sound activation position or the sound deactivation position.

Figure 14:
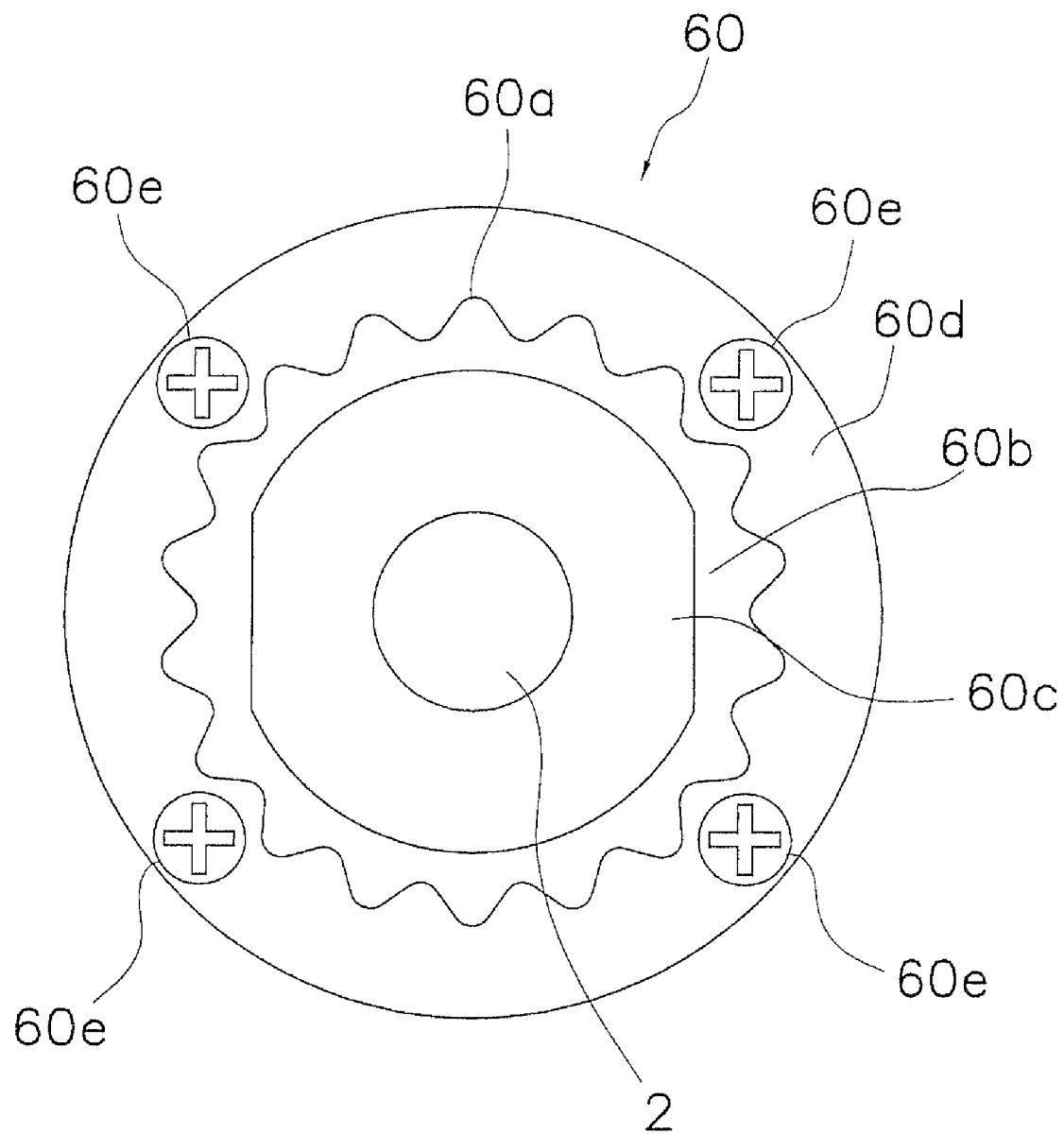
FIG. 14 is an elevational view of the convexo-concave member and its periphery.
Figure 15:
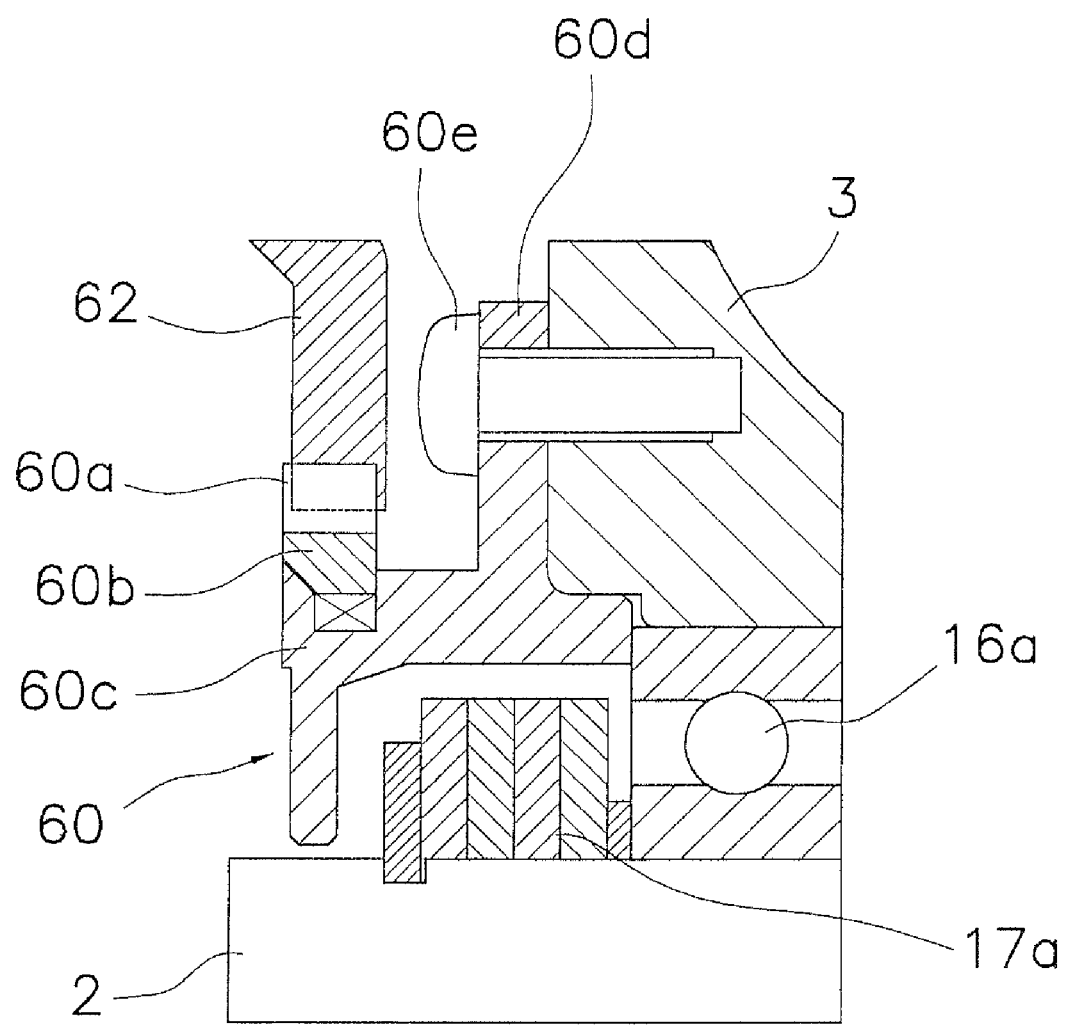
FIG. 15 is a cross-sectional side view of the convexo-concave member and its periphery.

As illustrated in FIGS. 2 to 5, the convexo-concave member 60 is a disc-shaped member with plural convexes 60*a*. The convexes 60*a* are circumferentially aligned on the outer periphery of the convexo-concave member 60 at predetermined intervals. The convexo-concave member 60 is configured to rotate in conjunction with the spool 3. As illustrated in FIGS. 14 and 15, the convexo-concave member 60 includes a plate-shape portion 60*b*, a tubular portion 60*c*, and an attachment portion 60*d*. The plate-shape portion 60*b* is formed in an annular shape and includes the convexes 60*a* on its outer periphery. The tubular portion 60*c* is formed as an individual component separate from the plate-shape portion 60*b*. The outer periphery of the front end (i.e., a left end in FIG. 15 or the end facing the spool 3) of the tubular portion 60*c* is fixed into the inner periphery of the plate-shape portion 60*b* by a caulking method. The tubular portion 60*c* is formed by die-casting in a tubular shape with a bottom. The attachment portion 60*d* is integrally formed with and to extend from the outer periphery of the base end (i.e., a right end in FIG. 15 or the end opposite the front end) of the tubular portion 60*c*. The attachment portion 60*d* is a flange to fix the convexo-concave member 60 to the spool 3 by screwing four bolts 60*e* into the spool 3. The inner peripheral outline of the plate-shape portion 60*b* and the outer peripheral outline of the tubular portion 60*c* are both formed in a non-circular shape formed by cutting a circle with two parallel chords. Therefore, the plate-shape portion 60*b* and the tubular portion 60*c* are disposed while their relative rotation is prevented relative to the spool shaft 2. As illustrated in FIGS. 14 and 15, positions of the bolts 60*e* are not overlapped with the convexes 60*a* but overlapped with an imaginary circle with radius corresponding to the outermost diameter of the plate-shape portion 60*b*. In other words, each bolt 60*e* is positioned such that at least its head extends radially inward past the radial extent of the convexes 60*a* into a concavity between two convexes 60*a*. Note the outermost diameter of the plate-shape portion 60*b* herein refers to the distance from the center of the spool shaft 2 to the tip of each convex 60*a*. Even if the plate-shape portion 60*b* has a large diameter, the bolts 60*e* can be herein attached to the attachment portions 60*d* without enlarging the diameter of the attachment portion 60*d*. Further, a portion of the tubular portion 60*c* axially extends from the side of the attachment portion 60*d* facing and contacting the spool into an aperture of the spool 3.

As illustrated in FIGS. 2, 3, 6-13, the collar member 65 is attached in an axial direction into the elongated aperture 12*f* that passes through the lateral part of the first cover member 12*a* and has a roughly oval outline in a radial direction. Longitudinal ends of the collar member 65 are formed in roughly circular shapes for matching with the outline of the elongated aperture 12*f*. The collar member 65 includes a first aperture 65*a* and a second aperture 65*b* that have circular or roughly or substantially circular outlines. Thus, more specifically, at least 180 degrees or substantially 180 degrees of the end of the first aperture 65*a* opposite the end of the first aperture 65*a* that intersects the second aperture 65*b* contacts a respective end of the elongated aperture 12*f*, and at least 180 degrees or substantially 180 degrees of the end of the second aperture 65*b* opposite the end of the second aperture 65*b* that intersects the first aperture 65*a* contacts the respective opposite end of the elongated aperture 12*f*. The first and second apertures 65*a* and 65*b* communicate with each other, while two imaginary circles, including the outlines of the first and second apertures 65*a* and 65*b*, are overlapped in a center part 65*c*. The outline of the inner circles of the first and second apertures 65*a* and 65*b* intersect such that an angle facing the other circle and formed by the center of one of the circles with the points of intersection is less than 180 degrees, and more preferably 90 degrees or less. The outline of each of the outer circles is greater than 180 degrees, and more preferably greater than 240 degrees. In other words, the outline of the collar member 65 is one of two overlapping circles. Further, the collar member 65 is a member made of elastic material.

Figure 8:
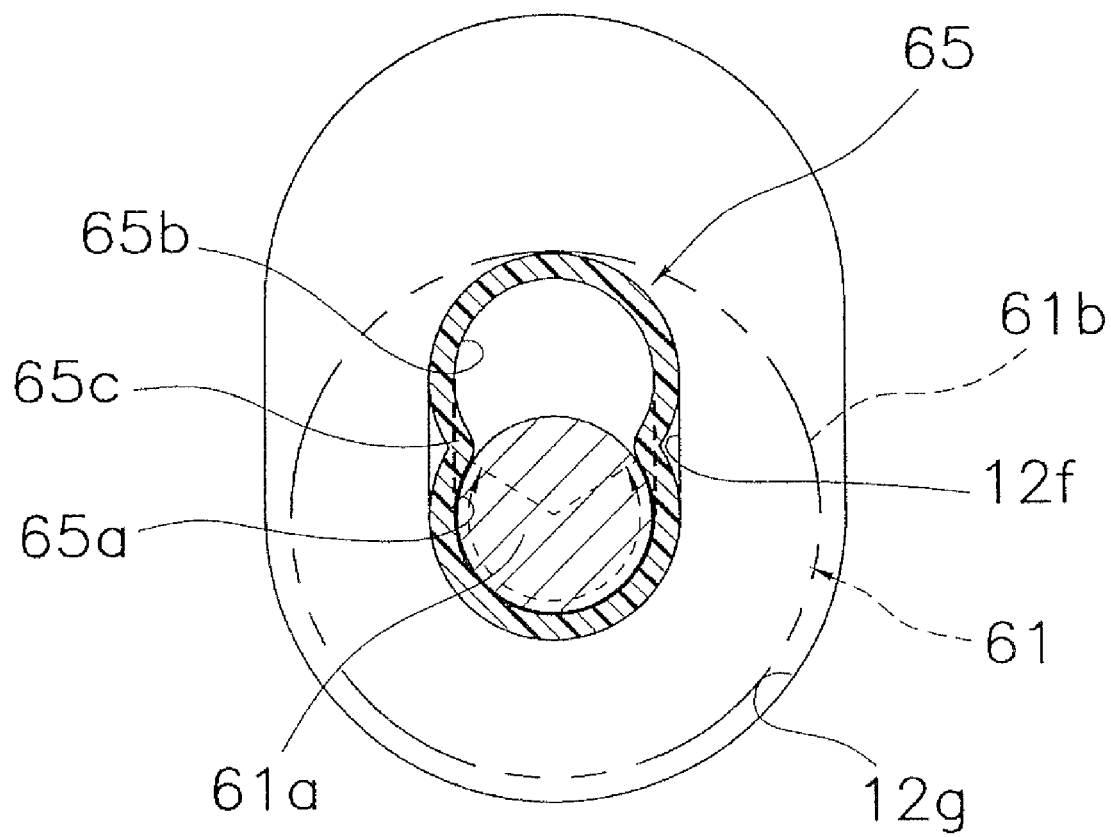
FIG. 8 is a cross-sectional elevational view of the operation member and the collar member when the spool sound producing mechanism is set to be in the sound activation state.
Figure 9:
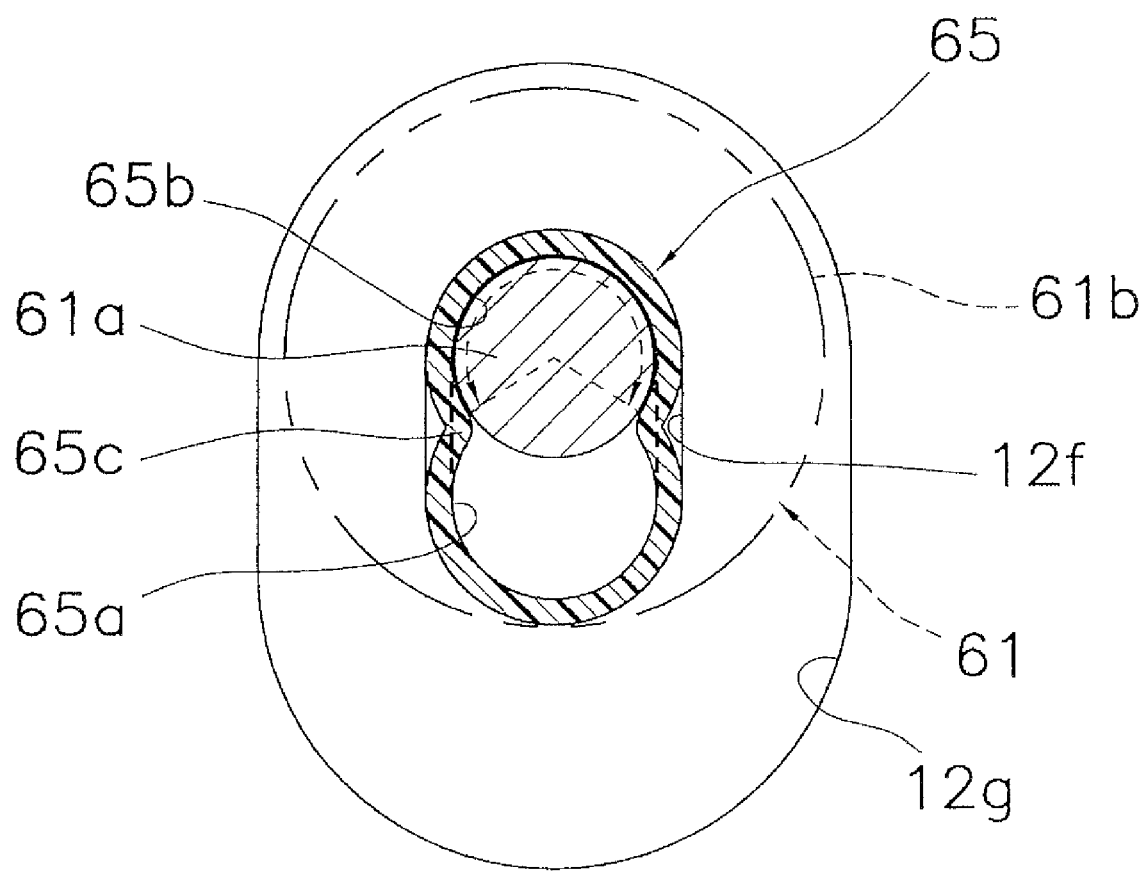
FIG. 9 is a cross-sectional elevational view of the operation member and the collar member when the spool sound producing mechanism is set to be in the sound deactivation state.

As illustrated in FIGS. 3-5, 8, 9, 12, and 13, the collar member 65 has a roughly calabash-shaped (i.e., 8-shaped) outline and is made of elastic synthetic resin such as polyacetal. In this case, when the collar member 65 is attached into the roughly-oval elongated aperture 12*f*, clearances are produced between the elongated aperture 12*f* and the both laterals sides of the center part 65*c* of the collar member 65. The clearances allow the center part 65*c* of the collar member 65 to be deformed and expanded. Therefore, a shaft portion 61*a* of the operation member 61 described below is allowed to be moved to one of the first and second apertures 65*a* and 65*b*. Specifically, when the shaft portion 61*a* of the operation member 61 is moved to the first aperture 65*a*, a sound producing portion 62*c* of the sound producing member 62 described below is moved to a sound activation position where the sound producing portion 62*c* is interposed between two given adjacent convexes 60*a* of the convexo-concave member 60. A sound activation state is thus produced. On the other hand, when the shaft portion 61*a* of the operation member 61 is moved to the second aperture 65*b*, the sound producing portion 62*c* of the sound producing member 62 is moved to a sound deactivation position where the sound producing portion 62c is separated from the interposed position between the adjacent convexes 60a of the convexo-concave member 60. A sound deactivation state is thus produced. As illustrated in FIGS. 6 to 13, the first aperture 65a is disposed on the center side of the first cover member 12a while being close to the convexes 60a of the convexo-concave member 60. On the other hand, the second aperture 65b is disposed on the outer peripheral side of the first cover member 12a while being separated away from the convexes 60a of the convexo-concave member 60. As illustrated in FIGS. 8, 9, 12, and 13, inner diameters of the first and second apertures 65a and 65b of the collar member 65 are roughly or substantially the same as the outer diameter of the shaft portion 61a of the operation member 61. In other words, each of the inner diameters of the first and second apertures 65a and 65b contacts the outer diameter of the shaft portion 61a when the shaft portion 61a is positioned therein. Referring to FIGS. 8 and 9 and the arrowed are dotted lines therein, each of the inner diameters of the first and second apertures 65a and 65b contacts at least 180 degrees or at least half of the outer diameter of the shaft portion 61a when the shaft portion 61a is positioned therein, and more preferably contacts at least 270 degrees of the outer diameter of the shaft portion 61a, and even more preferably contacts 240 degrees of the outer diameter of the shaft portion 61a. As illustrated in FIGS. 8 and 9, the longitudinal length of the collar member 65 is roughly or substantially the same as that of the elongated aperture 12f of the first cover member 12a. As illustrated in FIGS. 10 and 11, the collar member 65 is attached to the stepped portion 12h of the elongated aperture 12f, more precisely, the first wall 12j and the stepped portion 12h, while being prevented from being detached from it by a washer 61d and the operation portion 61b of the operation member 61. The washer 61d can be a metal washer.

As illustrated in FIGS. 2 to 13, the operation member 61 includes the shaft portion 61a and the operation portion 61b. The shaft portion 61a is attached to the collar member 65 in a movable state while being positioned to either of the first and second apertures 65a and 65b of the collar member 65. The shaft portion 61a extends from the operation portion 61b parallel or substantially parallel to the spool shaft 2. The operation portion 61b is attached to the front end (i.e., a left end in FIG. 10 or an end opposite the end that faces the spool 3) of the shaft portion 61a and is exposed to the outside of the lateral part of the first cover member 12a. The distal end (i.e., a right end in FIG. 10 or the end facing the spool 3) of the shaft portion 61a is attached to the sound producing member 62 in a pivotable state while being prevented from being detached from it by a C-shaped retainer ring 61c through which the shaft portion 61 extends. The shaft portion 61a extends through a first washer 61e and a second washer 61f. The first washer 61e is axially sandwiched between an interior surface of the first cover member 12a facing the spool 3 and a surface of the sound producing member 61 facing the interior surface of the first cover member 12a. The second washer 61f is sandwiched between a surface of the sound producing member 61 facing the spool 3 and a surface of the C-shaped retainer ring 61c opposite the surface of the C-shaped retainer ring 61c facing the spool 3. The shaft portion 61a is made of metal such as copper alloy. In the present exemplary embodiment, the sound activation state is produced when the shaft portion 61a is moved to the first aperture 65a, whereas the sound deactivation state is produced when the shaft portion 61a is moved to the second aperture 65b. As illustrated in FIGS. 3 and 6-9, the operation portion 61b is a knob portion with a roughly circular outline. The operation portion 61b is slid by, e.g., a finger of an angler. As illustrated in FIGS. 6 to 11, the operation portion 61b is contained in the housing recess 12g of the first cover member 12a. In the present exemplary embodiment, when the shaft portion 61a is moved to one of the first and second apertures 65a and 65b, clearance is produced between the operation portion 61b and the longitudinal end, opposed to or facing the selected one of the first and second apertures 65a and 65b, of the housing recess 12g in the radial direction of the first cover member 12a. The clearance allows an angler to manipulate the operation portion 61b with his/her finger regardless of whether the shaft portion 61a is positioned either the first aperture 65a or the second aperture 65b.

As illustrated in FIGS. 2 to 5, the sound producing member 62 is attached to the base end of the shaft portion 61a of the operation member 61 in a pivotable state. The tip of the sound producing member 62 is movable between a sound activation position and a sound deactivation position in conjunction with movement of the operation member 61 towards either the first aperture 65a or the second aperture 65b. The tip of the sound producing member 62 is interposed between two given adjacent convexes 60a of the convexo-concave member 60 in the sound activation position, whereas the tip of the sound producing member 62 is separated from the interposed position between the adjacent two convexes 60a of the convexo-concave member 60. The sound producing member 62 is a plate-shaped member with a roughly T-shaped outline. The sound producing member 62 includes a first attachment portion 62a and a second attachment portion 62b on both of its ends. The first urging member 63 is attached to the first attachment portion 62a, whereas the second urging member 64 is attached to the second attachment portion 62b. Further, the sound producing member 62 includes the sound producing portion 62c. The sound producing portion 62c extends from the center part, interposed between the first and second attachment portions 62a and 62b, in a direction perpendicular or substantially perpendicular to the first and second attachment portions 62a and 62b. In other words, in the sound activation position, the sound producing member 62 has a sound producing portion 62c that extends in a radial direction of the first cover member 12a, and the first and second attachment portions 62a and 62b that extend in a circumferential direction or along a first secant line of the first cover member 12a that does not pass through the center. In other words, the first secant line is geometrically skewed relative to the axis of rotation of the spool 3. More specifically, centers of the holes of the first and second attachment portions 62a and 62b lie on the first secant line. Further, in this embodiment, the sound producing member 62 has a through hole 62d through which the shaft portion 61a passes. In this embodiment, in the sound activation position, the through hole 62d is located outside the first secant line in a radial direction of the first cover member 12a, but may be placed in other suitable locations. In the present exemplary embodiment, when the shaft portion 61a of the operation member 61 is moved to the first aperture 65a, the sound producing portion 62c of the sound producing member 62 is moved to the sound activation position where it is interposed between two given adjacent convexes 60a of the convexo-concave member 60. Accordingly, the sound activation state is produced (see FIG. 4). On the other hand, when the shaft portion 61a of the operation member 61 is moved to the second aperture 65b, the sound producing portion 62c of the sound producing member 62 is moved to the sound deactivation position where it is separated from the interposed position between the two adjacent convexes 60a of the convexo-concave member 60. Accordingly, the sound deactivation state is produced (see FIG. 5).

Figure 4:
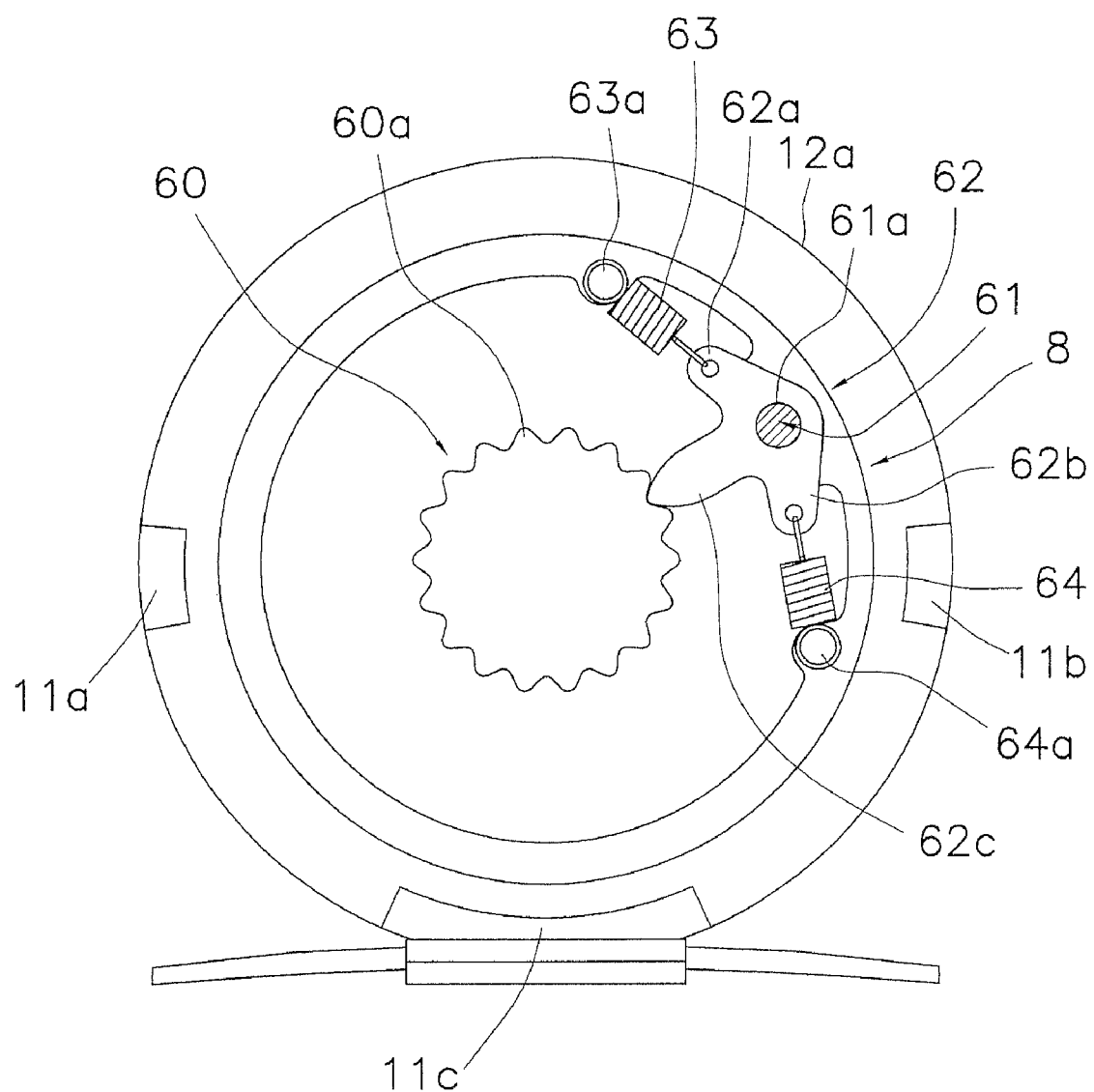
FIG. 4 is a simplified side view of an operation member, a convexo-concave member, a sound producing member, and their peripheries in the dual-bearing reel when the spool sound producing mechanism is set to be in a sound activation state.
Figure 5:
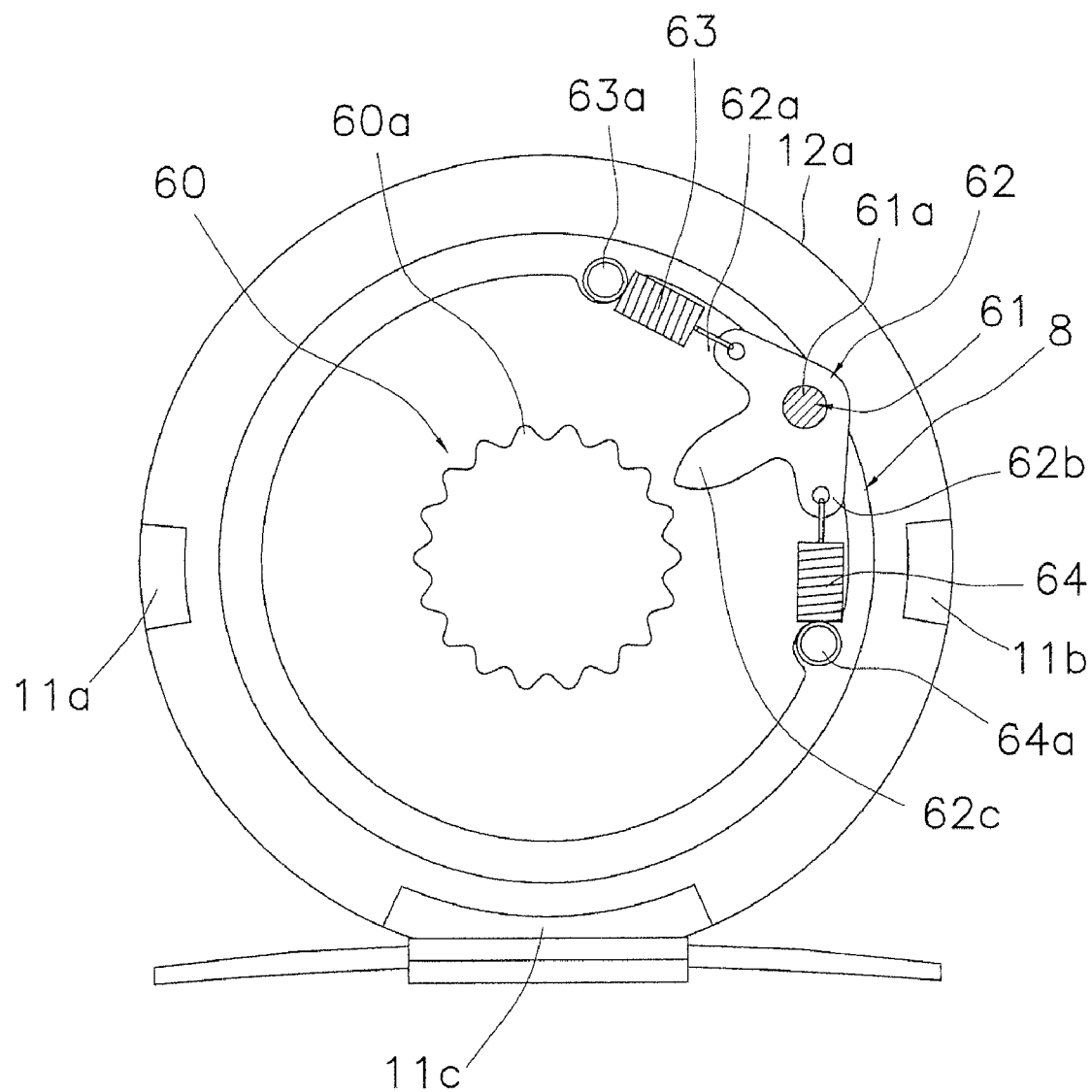
FIG. 5 is a simplified side view of the operation member, the convexo-concave member, the sound producing member, and their peripheries in the dual-bearing reel when the spool sound producing mechanism is set to be in a sound deactivation state.

As illustrated in FIGS. 3 to 5, the first urging member 63 and the second urging member 64 are respectively coil springs for urging the sound producing member 62 in order to direct the tip of the sound producing member 62 towards the rotation center of the convexo-concave member 60. As illustrated in FIGS. 4 and 5, one end of the first urging member 63 is hooked onto a first attachment pin 63a, whereas one end of the second urging member 64 is hooked onto a second attachment pin 64a. The first and second attachment pins 63a and 64a are raised on or extend from the back side, i.e., the side facing the spool 3, of the first cover member 12a while being partially inserted into boss holes formed in the back side of the first cover member 12a. In this embodiment the centers of the attachment pins 63a and 64a lie on a second secant line that is arranged radially inside the first secant line relative to first cover member 12a and is parallel to the first secant line. The other end of the first urging member 63 is hooked in the first attachment portion 62a of the sound producing member 62, whereas the other end of the second urging member 64 is hooked in the second attachment portion 62b of the sound producing member 62. In the present exemplary embodiment, the first and second urging members 63 and 64 urge the sound producing member 62 while pulling the sound producing member 62 towards the convexes 60a of the convexo-concave member 60.

The spool sound producing mechanism 8 is provided with the collar member 65 made of elastic material. The collar member 65 is attached into the elongated aperture 12f with a roughly oval outline while passing through the lateral part of the first cover member 12a. The collar member 65 further includes the first aperture 65a and the second aperture 65b. Further, the shaft portion 61a of the operation member 61 is configured to be moved and set to one of the first and second apertures 65a and 65b of the collar member 65. According to the spool sound producing mechanism 8, the sound activation state is produced when the sound producing portion 62c of the sound producing member 62 is moved to the sound activation position where it is interposed between two given adjacent convexes 60a of the convexo-concave member 60 in conjunction with movement of the shaft portion 61a of the operation member 61 towards the first aperture 65a of the collar member 65 (see FIGS. 4, 6, 8, 10 and 12). On the other hand, the sound deactivation state is produced when the sound producing portion 62c of the sound producing member 62 is moved to the sound deactivation position where it is separated from the interposed position between the adjacent convexes 60a of the convexo-concave member 60 in conjunction with movement of the shaft portion 61a of the operation member 61 towards the second aperture 65b of the collar member 65 (see FIGS. 5, 7, 9, 11 and 13).

As illustrated in FIGS. 1 and 2, the second cover member 12b, disposed on the same side as the handle 4, has a bulged portion 12d. The bulged portion 12d protrudes in both a radial direction and an axial outward direction. As illustrated in FIG. 2, the bulged portion 12d contains the rotation transmission mechanism 6 in its interior. Further, the second cover member 12b has a support tubular portion 12e in the lower part of the bulged portion 12d. The support tubular portion 12e protrudes in an axial outward direction, and supports a handle shaft 20 of the handle 4.

As illustrated in FIG. 2, the spool shaft 2 is supported by the boss portion 12c of the first cover member 12a and the second cover member 12b while being prevented from rotating and allowed to move axially relative to the reel body 1. The spool shaft 2 is provided with an anti-rotation pin 2a. Specifically, the anti-rotation pin 2a is attached to the left end, or the end supported by the boss portion 12c, of the spool shaft 2 while passing through the spool shaft 2 in a radial direction. On the other hand, the boss portion 12c of the first cover member 12a has an anti-rotation slit 12i (see FIG. 3) to be engaged with the anti-rotation pin 2a. The anti-rotation slit 12i is formed along a radial direction of the boss portion 12c.

The spool shaft 2 supports the spool 3 in a rotatable state through first and second bearings 16a and 16b disposed on the outer periphery of the spool shaft 2. The first bearing 16a is urged in an axial inward direction (i.e., rightward in FIG. 2) by a first spring member 17a that is a disc-spring type. On the other hand, the second bearing 16b is urged in an axial inward direction (i.e., leftward in FIG. 2) by a second spring member 17b that is a coil-spring type. Further, the axial inward surfaces of the first and second bearings 16a and 16b are prevented from inwardly moving by the spool 3 and the spool shaft 2. The structure enables the spool shaft 2 and the spool 3 to move unitarily in the axial direction. The spool shaft 2 is axially moved with the spool 3 by the lever drag mechanism 9.

As illustrated in FIG. 2, the spool 3 includes a bobbin trunk 3a and a pair of flanges 3b integrally formed on the both edges of the bobbin trunk 3a. In addition, a friction disc 41 is fixed to the end surface of the right-side flange 3b by a screw. The friction disc 41 forms a part of the lever drag mechanism 9.

As illustrated in FIG. 2, the handle 4 is secured to the protruded end of the tubular handle shaft 20 disposed below and in parallel to the spool shaft 2. The handle shaft 20 is supported by the reel body 1 in a rotatable state.

As illustrated in FIG. 2, the rotation transmission mechanism 6 includes a speed-change mechanism configured to switch handle rotation between a high-speed level and a low-speed level. As illustrated in FIG. 2, the rotation transmission mechanism 6 includes a first main gear 18, a second main gear 19, a first pinion gear 21, a second pinion gear 22, an engaging piece 23, a first compression spring 24a, a second compression spring 24b, and an operation shaft 25. The first main gear 18 and the second main gear 19 are respectively supported by the handle shaft 20 of the handle 4 in a rotatable state. The first main gear 18 is used for winding the fishing line at high speed, whereas the second main gear 19 is used for winding the fishing line at low speed. The first pinion gear 21 and the second pinion gear 22 are respectively attached to the spool shaft 2 in a rotatable state. Simultaneously, the first pinion gear 21 is meshed with the first main gear 18, whereas the second pinion gear 22 is meshed with the second main gear 19. The engaging piece 23 couples either the first main gear 18 or the second main gear 19 to the handle shaft 20. Accordingly, handle rotation is delivered to the coupled one of the first main gear 18 and the second main gear 19 via the handle shaft 20. The first compression spring 24a (an example of an operation shaft urging member) is disposed on the left side, i.e., the side opposite the handle 4, of the engaging piece 23 in FIG. 2. The first compression spring 24a urges the operation shaft 25 in an axial outward direction (i.e., rightward in FIG. 2) through the engaging piece 23 and the second compression spring 24b. The second compression spring 24b is disposed on the right side, i.e., the handle side, of the engaging piece 23 in FIG. 2. The second compression spring 24b urges the engaging piece 23 towards the second main gear 19. The operation shaft 25 sets the engaging piece 23 to be in either a high-speed position or a low-speed position. The engaging piece 23 is engaged with the first main gear 18 in the high-speed position, whereas the engaging piece 23 is engaged with the second main gear 19 in the low-speed position. In FIG. 2, the engaging piece 23 set to be in the high-speed position is depicted with a solid line, whereas the engaging piece 23 set to be in the low-speed position is depicted with a dashed two-dotted line.

As illustrated in FIG. 2, the first pinion gear 21 is a tubular member. The first pinion gear 21 is made of anti-corrosive metal (e.g., non-magnetic stainless alloy). The right end of the first pinion gear 21 is supported by a fourth bearing 16d in a rotatable state. The fourth bearing 16d is attached to the bulged portion 12d while being disposed about the spool shaft 2. On the other hand, the left end of the first pinion gear 21 is engaged with a drag disc 42 of the lever drag mechanism 9 while being unitarily rotatable with it. The second pinion gear 22 is a tubular member made of the same material as the first pinion gear 21. The left end of the second pinion gear 22 is engaged with the drag disc 42 while being unitarily rotatable with it. The engaging piece 23 is disposed within a slit of the handle shaft 20 in a non-rotatable state. As illustrated in FIG. 2, the operation shaft 25 is inserted through the through hole 20a of the handle shaft 20. In FIG. 2, the right end of the operation shaft 25 protrudes in an axial outward direction of the handle 4 (i.e., rightward in FIG. 2). The operation shaft 25 can be thereby pressed leftward in FIG. 2.

According to the rotation transmission mechanism 6 with the foregoing structure, the engaging piece 23 is engaged with the second main gear 19 when the operation shaft 25 is pushed leftward in FIG. 2 by a press operation of the operation shaft 25. Under this condition, rotation of the handle 4 is delivered to the second pinion gear 22 through the second main gear 19. The spool 3 is accordingly rotated at low speed. On the other hand, the engaging piece 23 is engaged with the first main gear 18 when the operation shaft 25 is pulled rightward in FIG. 2. Under this condition, rotation of the handle 4 is delivered to the first pinion gear 21 through the first main gear 18. The spool 3 is accordingly rotated at high speed.

As illustrated in FIG. 2, the lever drag mechanism 9 includes the friction disc 41, the drag disc 42, and a moving mechanism 43. The friction disc 41 is attached to the right end of the spool 3 in FIG. 2. The drag disc 42 is opposed to the friction disc 41. The moving mechanism 43 is configured to reciprocate axially the spool shaft 2 relative to the reel body 1.

As illustrated in FIG. 2, the friction disc 41 is a disc washer member made of abrasion-resistant material (e.g., carbon graphite, fiber reinforced resin, etc.). The friction disc 41 is fixed to the outer surface of the right-side flange 3b of the spool 3 by means of plural attachment bolts. The attachment bolts are herein circumferentially arranged at predetermined intervals.

As illustrated in FIG. 2, the drag disc 42 includes a disc body 45 and a brake disc 46. The disc body 45 is engaged with the first pinion gear 21 and the second pinion gear 22 while being unitarily rotatable with them. The brake disc 46 is fixed to the disc body 45 by plural attachment bolts while being opposed to the friction disc 41. The brake disc 46 is made of, for instance, stainless steel. Again, the disc body 45 is a disc member produced by aluminum die casting. The disc body 45 is supported by the spool shaft 2 through a third bearing 16c in a rotatable state. The brake disc 46 is fixed to the surface of the disc body 45 opposed to the spool 3.

As illustrated in FIG. 2, the moving mechanism 43 includes a drag lever 80, a pull mechanism 81, and the second spring member 17b. The drag lever 80 is attached to the reel body 1 in a pivotable state. The pull mechanism 81 is configured to pull and to move the spool shaft 2 rightward in FIG. 2 in response to a clockwise pivot of the drag lever 80 in FIG. 1. The second spring member 17b is configured to urge and to move the spool shaft 2 leftward in FIG. 2 in response to a counterclockwise movement of the drag lever 80 in FIG. 1.

The drag lever 80 is pivoted for adjusting the magnitude of drag force of the lever drag mechanism 9 in the lever drag reel with the foregoing structure. When the drag lever 80 is set in a drag release position (i.e., the outermost pivot position in the counterclockwise direction in FIG. 1), the friction disc 41 is separated from the drag disc 42 in the lever drag mechanism 9. A drag release state is thus produced, and the spool 3 is set to be in a rotatable state. Casting can be performed under this condition. When the drag lever 80 is pivoted in the clockwise direction in FIG. 1, the friction disc 41 is gradually moved in the axial outward direction of the spool shaft 2 (i.e., rightward in FIG. 2), and the spool shaft 2 and spool 3 are gradually moved rightward. Consequently, the friction disc 41 strongly presses the drag disc 42, and drag force is thus increased.

The spool sound producing mechanism 8 of the lever drag reel of the foregoing structure is provided with the collar member 65 made of elastic material. The collar member 65 is attached into the elongated aperture 12f that has a roughly oval outline and passes through the lateral part of the first cover member 12a. The collar member 65 further includes the first and second apertures 65a and 65b. Further, the shaft portion 61a of the operation member 61 is configured to be moved and set to one of the first and second apertures 65a and 65b of the collar member 65. According to the spool sound producing mechanism 8, the sound activation state is produced when the sound producing portion 62c of the sound producing member 62 is moved to the sound activation position where it is interposed between two given adjacent convexes 60a of the convexo-concave member 60 in conjunction with movement of the shaft portion 61a of the operation member 61 towards the first aperture 65a of the collar member 65. On the other hand, the sound deactivation state is produced when the sound producing portion 62c of the sound producing member 62 is moved to the sound deactivation position where it is separated from the interposed position between the adjacent convexes 60a of the convexo-concave member 60 in conjunction with movement of the shaft portion 61a of the operation member 61 towards the second aperture 65b of the collar member 65. Overall, the spool sound producing mechanism 8 is thus provided with the collar member 65 that is made of elastic material and includes the first and second apertures 65a and 65b. Therefore, the center part 65c of the collar member 65 is deformed and expanded when the shaft portion 61a of the operation member 61 is moved to one of the first and second apertures 65a and 65b of the collar member 65. The shaft portion 61a of the operation member 61 is thereby moved and set to the selected one of the first and second apertures 65a and 65b of the collar member 65. Consequently, the structure of the spool sound producing mechanism 8 can be simplified with the collar member 65 that is made of elastic material and includes the first and second apertures 65a and 65b formed in relatively simple shapes. Further, when the shaft portion 61a of the operation member 61 is moved to one of the first and second apertures 65a and 65b of the collar member 65, it is possible to make an angler feel a sense of clicking to an extent the angler assures that the shaft portion 61a has reliably moved.

As seen in FIG. 6, when a user wants to put the spool sound producing mechanism 8 in the sound activation state, he or she moves the operation portion 61b of the operation member 61 radially inward to move the operation member 61 to the first aperture 65a of the collar member 65. Referring to FIGS. 4 and 10, the shaft portion 61a, which extends through the collar member 65 from the operation portion 61b and is attached to the sound producing member 62, moves the sound producing member such that the sound producing portion 62c rests between two convexes 60a. When the spool 3 rotates, the convexo-concave member 60, which cannot rotate relative to the spool 3, rotates with the spool 3. Since outer radial movement of the sound producing member 62 is inhibited by the first and second urging members 63 and 64 and by the shape of the first aperture 65a, which contacts most of an outer diameter of the shaft portion 61a, the sound producing member 62 pivots in the direction of rotation only to pivot in the opposite direction to contact a second convex 60 once a first convex 60a has moved past the sound producing portion 62c. The contact of the sound producing portion 62c produces a sound.

Referring to FIG. 7, when a user wants to put the spool sound producing mechanism 8 in the sound deactivation state, he or she moves the operation portion 61b radially outward to move the operation member 61 to the second aperture 65a. As seen in FIGS. 5 and 11, the shaft portion 61a moves the sound producing member 62 such that the convexes 60a cannot contact the sound producing member 62, and thus cannot make sound with the sound producing member 62. The operation member 61 is held in this position by the shape of the second aperture 65b, which contacts most of the diameter of the shaft portion 61a.

Due to the aforementioned structure, when the user moves the operation member 61 to either the first aperture 65a or second aperture 65b, he or she is able to feel a sense of clicking in the movement that indicates that the operation member 61 has been moved.

Other Exemplary Embodiments (a) The foregoing exemplary embodiment has exemplified the medium-sized lever drag reel. However, the present invention is not limited to this. The present invention is applicable to any suitable dual-bearing reels as long as it is provided with a sound producing device.

(b) In the foregoing exemplary embodiment, the collar member 65 is made of elastic synthetic resin such as polyacetal. However, material of the collar member 65 is not limited to this. For example, the collar member 65 may be a spring member made of elastic metal.

(c) In the foregoing exemplary embodiment, the collar member 65 has the roughly calabash-shaped (i.e., 8-shaped) outline. However, the outline shape of the collar member 65 is not limited to this. As described above, clearances are formed between the outline of the elongated aperture 12f of the first cover member 12a and both lateral sides of the center part 65c forming the narrowed lateral portions of the roughly calabash-shaped collar member 65. However, one of the clearances may be eliminated by forming one of the narrowed lateral portions in a linear shape.

(d) In the foregoing exemplary embodiment, the sound producing member 65 has a roughly T-shaped outline. However, the outline shape of the sound producing member 62 is not limited to this.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms, "including," "having," and their derivatives. Also, the terms "part," "section," "portion," "member," or "element" when used in the singular can have the dual meaning of a single part or a plurality of parts. As used herein to describe the present invention, the following directional terms "forward, rearward, above, downward, vertical, horizontal, below, and transverse" as well as any other similar directional terms refer to those directions of a dual bearing reel equipped with a dual-bearing reel sound producing device. Accordingly, these terms, as utilized to describe the present invention should be interpreted relative to a dual bearing reel equipped with a dual-bearing reel sound producing device as normally used. Finally, terms of degree such as "substantially," "about," and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A dual-bearing reel sound producing device configured to produce sound in conjunction with rotation of a fishing-line winding spool attached to a reel body of a dual-bearing reel in a rotatable state, comprising:
   a collar member made of elastic material, the collar member attached into an elongated aperture passing through a lateral part of the reel body and having a roughly oval outline, the collar member including
      a first aperture having a roughly circular outline, and
      a second aperture having a roughly circular outline,
      the first and second apertures communicating with each other while partially overlapping each other in a center part of the collar member,
      an outer shape of the collar member nearly corresponding to an inner shape of the elongated aperture;
   an operation member including
      a shaft portion having a front end and distal end opposite the front end, and movably attached to and positioned in either the first aperture or the second aperture of the collar member, and
      an operation portion disposed on the front end of the shaft portion, the operation portion exposed on a lateral outer side of the reel body;
   a disc-shaped convexo-concave member configured to rotate in conjunction with rotation of the spool, the convexo-concave member including a plurality of convexes on an outer periphery thereof, the plurality of convexes circumferentially arranged at predetermined intervals;
   a sound producing member attached to the distal end of the shaft portion of the operation member in a pivotable state, the sound producing member configured to move to either a sound activation position or a sound deactivation position in conjunction with movement of the operation member to either the first aperture or the second aperture, the sound activation position allowing a tip of the sound producing member to be disposed between any two adjacent convexes of the plurality of convexes of the convexo-concave member, the sound deactivation position allowing the tip of the sound producing member to be separated away from said any two adjacent convexes of the plurality of convexes of the convexo-concave member; and urging members configured to urge the sound producing member to direct the tip of the sound producing member towards the rotation center of the convexo-concave member.

2. The dual-bearing reel sound producing device according to claim 1, wherein
the collar member is an elastic member made of synthetic resin.

3. The dual-bearing reel sound producing device according to claim 1, wherein
the collar member has a roughly calabash-shaped outline.

4. The dual-bearing reel sound producing device according to claim 1, wherein
the first and second apertures of the collar member respectively have an inner diameter roughly the same as an outer diameter of the shaft portion.

5. The dual-bearing reel sound producing device according to claim 1, wherein
the collar member has a long axis length roughly the same as a long axis length of the elongated aperture.

6. The dual-bearing reel sound producing device according to claim 1, wherein
the shaft portion is made of metal.

7. The dual-bearing reel sound producing device according to claim 1, wherein
the sound producing member has a roughly T-shaped outline, and includes attachment portions and a sound producing portion,
the attachment portions are formed on opposite ends of the sound producing member and attach to the urging members, and
the sound producing portion extends from a center part interposed between the attachment portions in a direction perpendicular to the attachment portions.

8. The dual-bearing reel sound producing device according to claim 1, wherein
each of the first and second apertures of the collar member is arranged to contact at least half the outer diameter of the shaft portion when the shaft portion is positioned therein.

9. The dual-bearing reel sound producing device according to claim 8, wherein
each of the first and second apertures of the collar member is arranged to contact at least 270 degrees of the outer diameter of the shaft portion when the shaft portion is positioned therein.

\* \* \* \* \*